(12) United States Patent
Homan

(10) Patent No.: US 9,121,260 B2
(45) Date of Patent: Sep. 1, 2015

(54) ELECTRICALLY NON-CONDUCTIVE SLEEVE FOR USE IN WELLBORE INSTRUMENTATION

(75) Inventor: Dean M. Homan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1825 days.

(21) Appl. No.: 12/234,822

(22) Filed: Sep. 22, 2008

(65) Prior Publication Data

US 2010/0071794 A1 Mar. 25, 2010

(51) Int. Cl.
*F16L 11/00* (2006.01)
*E21B 47/01* (2012.01)
*G01V 3/18* (2006.01)

(52) U.S. Cl.
CPC .. *E21B 47/01* (2013.01); *G01V 3/18* (2013.01)

(58) Field of Classification Search
CPC ........................................................ E21B 17/00
See application file for complete search history.

(56) References Cited

U.S. PATENT DOCUMENTS

| | | | |
|---|---|---|---|
| 4,651,101 A | 3/1987 | Barber et al. | |
| 5,212,495 A | 5/1993 | Winkel et al. | |
| 5,921,285 A * | 7/1999 | Quigley et al. | 138/125 |
| 6,288,548 B1 | 9/2001 | Thompson et al. | |
| 6,429,653 B1 | 8/2002 | Kruspe et al. | |
| 6,710,600 B1 * | 3/2004 | Kopecki et al. | 324/338 |
| 7,026,813 B2 * | 4/2006 | Homan et al. | 324/247 |
| 7,091,877 B2 * | 8/2006 | Barber et al. | 340/853.1 |
| 2002/0119271 A1 | 8/2002 | Quigley | |
| 2003/0230893 A1 | 12/2003 | Song et al. | |
| 2005/0173121 A1 * | 8/2005 | Steele et al. | 166/313 |

FOREIGN PATENT DOCUMENTS

EP 0911483 6/2002

* cited by examiner

*Primary Examiner* — Hezron E Williams
*Assistant Examiner* — Mark A Shabman
(74) *Attorney, Agent, or Firm* — John Vereb; Cathy Hewitt

(57) ABSTRACT

A well logging instrument housing includes an electrically non-conductive tube and at least one layer of fiber embedded in a matrix surrounding an exterior of the tube. The at least one fiber layer includes at least one carbon fiber. The at least one or carbon fiber is arranged to have substantially no closed loops.

20 Claims, 5 Drawing Sheets

ELECTRICALLY NON-CONDUCTIVE SLEEVE FOR USE IN WELLBORE INSTRUMENTATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of measuring instrumentation used in wellbores drilled through subsurface rock formations. More specifically, the invention relates to structures usable as housings for such instrumentation.

2. Background Art

Wellbore-deployed instrumentation includes various sensing devices disposed in a housing or "sub" coupled within a conduit called a "drill string" suspended in a wellbore for the drilling of such wellbore. A drill string is a length of pipe generally assembled from segments ("joints") threadedly coupled end to end and having a drill bit at the lower end of the drill string. Drilling is performed by rotating and axially urging the drill bit to the bottom of the wellbore to extend the length of the wellbore. Wellbore deployed instrumentation also includes various sensing devices disposed in housing(s) moved along the interior of the wellbore using armored electrical cable, "slickline" or other conveyance deployed from the surface. The various sensing devices within the instruments are used to impart certain types of energy into the rock formations outside the wellbore, and to detect response of the formations to such imparted energy.

Irrespective of the type of sensor or the type of conveyance of the various instruments along the interior of the wellbore, a common feature of such wellbore instrumentation is that electronic components and sensing elements are disposed in a pressure-sealed or pressure balanced housing that excludes wellbore fluid under pressure from entering the interior of such housing. Housings made from steel, stainless, steel, non-magnetic metal alloy (e.g., monel), for example, are used because of their high tensile strength and resistance to crushing under hydrostatic pressure of fluid within the wellbore. However, such housings are heavy, and can be expensive to make. Further, it is frequently necessary to mount certain sensing elements next to energy transparent "windows" or within recesses machined into the exterior wall of the housing in order to be able to impart energy into the rock formations surrounding the well and to detect the formation response therefrom. Still other examples of wellbore instrumentation may include electromagnetic transmitters and/or receivers in the form of solenoid, toroidal, planar, tilted, triaxial, etc coils disposed on an electrically conductive mandrel.

Accordingly, there exists a need for high temperature, high pressure, abrasive resistant, chemically resistant, lighter weight, strong, energy transparent materials from which to make wellbore instrument housings.

SUMMARY OF THE INVENTION

A well logging instrument housing according to one aspect of the invention includes an electrically non-conductive tube and at least one layer of fiber embedded in a matrix surrounding an exterior of the tube. The at least one fiber layer includes at least one carbon fiber. The at least one carbon fiber is arranged to have substantially no closed loops therein. An electromagnetic well logging instrument according to another aspect of the invention includes an electrically non-conductive tube. At least one layer of fiber embedded in a matrix surrounds an exterior of the tube. The at least one fiber layer includes at least one carbon fiber. The at least one carbon fiber is arranged to have substantially no closed loops therein. At least one of an electromagnetic receiver and an electromagnetic transmitter is disposed inside the tube.

A method for making a well logging instrument housing according to another aspect of the invention includes applying at least one layer of fiber over an electrically non-conductive tube. The layer of fiber includes at least one carbon fiber arranged to have substantially no closed loops. The fiber layer including a resin matrix. The method includes bonding the at least one layer of fiber to an exterior of the tube.

Other aspects and advantages of the invention will be apparent from the following description and the appended claims.

DETAILED DESCRIPTION

Figure 1:
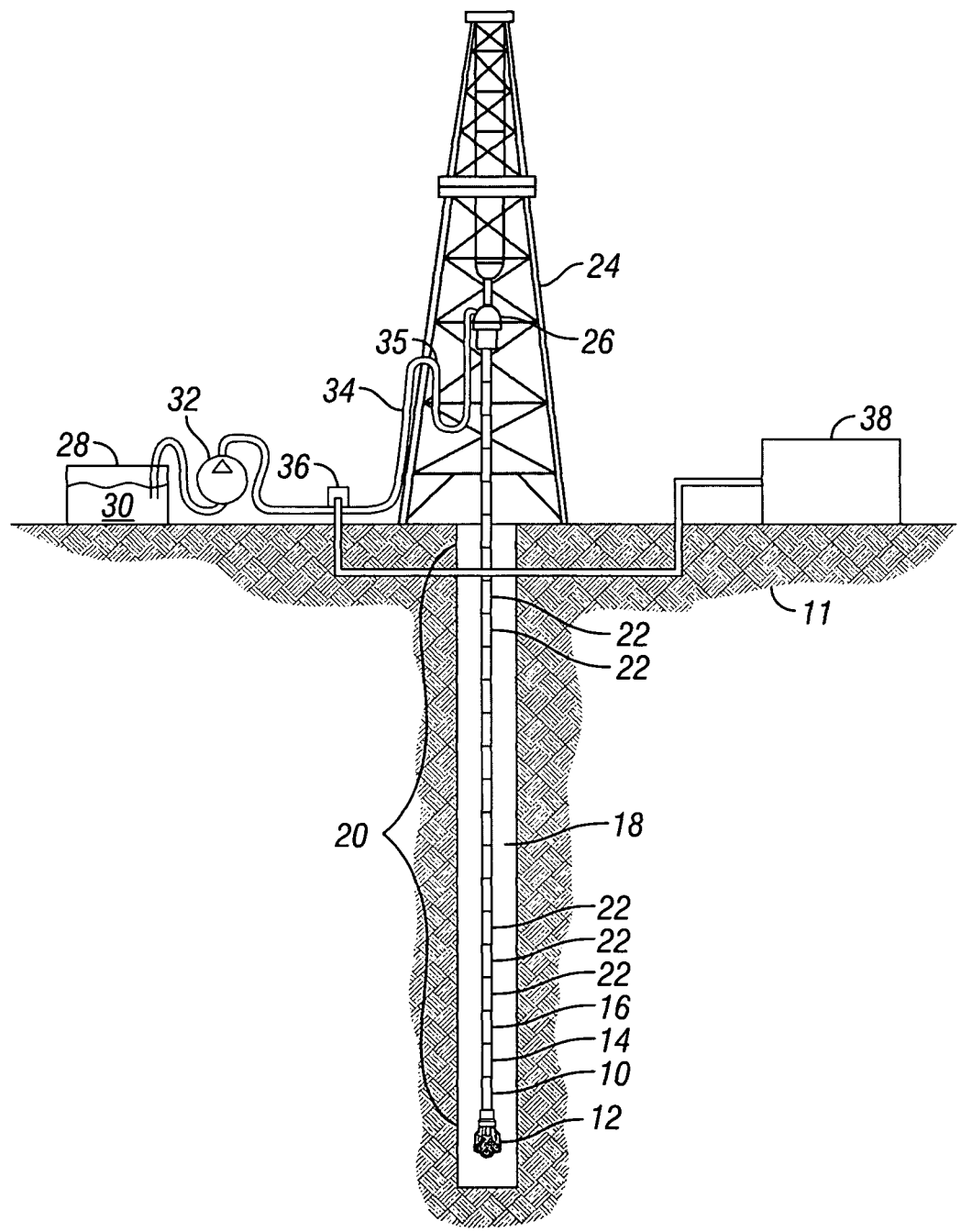
FIG. 1 shows an example drilling system including various wellbore instruments disposed within housings according to various examples of the invention.

An example wellbore instrumentation system that may be disposed in a composite tubular housing made according to one example of the invention is shown schematically in FIG. 1. The present example is described in terms of drilling instrumentation, however it should be understood that an instrument housing according to the various aspects of the invention may be used in wellbore instruments that are conveyed along a wellbore using any other known conveyance devices, including without limitation by armored electrical cable ("wireline"), coiled tubing, production tubing, smooth-wire ("slickline") and wellbore tractor. Therefore, the invention is not limited in scope to housings that are coupled within a drill string In FIG. 1, a drilling rig 24 or similar lifting device suspends a conduit called a "drill string 20" within a wellbore 18 being drilled through subsurface rock formations 11. The drill string 20 may be assembled by threadedly coupling together end to end a number of segments ("joints") 22 of drill pipe. The drill string 20 may include a drill bit 12 at its lower end. When the drill bit 12 is axially urged into the formations 11 at the bottom of the wellbore 18 and when it is rotated by equipment (e.g., top drive 26) on the drilling rig 24, such urging and rotation causes the bit 12 to axially extend ("deepen") the wellbore 18. The lower end of the drill string 20 may include, at a selected position above and proximate to the drill bit 12, a logging while drilling ("LWD") sensor sub 10 that may be enclosed in a housing according to various aspects of the invention and which will be further explained below. Proximate its lower end of the drill string 20 may also include a measurement while drilling ("MWD") instrument sub 14 and a power/telemetry sub 16 of types well known in the art. The MWD instrument sub 14 and the power/telemetry sub 16 may or may not be disposed in a composite housing according to the various aspects of the invention.

During drilling of the wellbore 18, a pump 32 lifts drilling fluid ("mud") 30 from a tank 28 or pit and discharges the mud 30 under pressure through a standpipe 34 and flexible conduit 35 or hose, through the top drive 26 and into an interior passage (not shown separately in FIG. 1) inside the drill string 20. The mud 30 exits the drill string 20 through courses or nozzles (not shown separately) in the drill bit 12, where it then cools and lubricates the drill bit 12 and lifts drill cuttings generated by the drill bit 12 to the Earth's surface. Some examples of telemetry sub 16 may include a telemetry transmitter (not shown separately) that modulates the flow of the mud 30 through the drill string 20. Such modulation may cause pressure variations in the mud 30 that may be detected at the Earth's surface by a pressure transducer 36 coupled at a selected position between the outlet of the pump 32 and the top drive 26. Signals from the transducer 36, which may be electrical and/or optical signals, for example, may be conducted to a recording unit 38 for decoding and interpretation using techniques well known in the art. The decoded signals typically correspond to measurements made by one or more of the sensors (not shown) in the MWD instrument 14 and/or the LWD instrument 10.

It will be appreciated by those skilled in the art that the top drive 26 may be substituted in other examples by a swivel, kelly, kelly bushing and rotary table (none shown in FIG. 1) for rotating the drill string 20 while providing a pressure sealed passage through the drill string 20 for the mud 30. Accordingly, the invention is not limited in scope to use with top drive drilling systems.

Any of the foregoing MWD instrument 14, LWD instrument 10 and power/telemetry sub 16 may be enclosed in a housing that is substantially electrically non-conductive, and is made from a composite material including one or more types of resin, ceramic, thermoplastic and/or thermoset plastic used as an inner tube or conduit, and one or more layers of fiber reinforced plastic disposed over the inner conduit to provide the composite structure with strength, resistance to adsorption of fluid, temperature resistance and abrasion resistance. Examples of composite structures and processes for making such structures will now be explained with reference to FIGS. 2 through 6.

Figure 2:
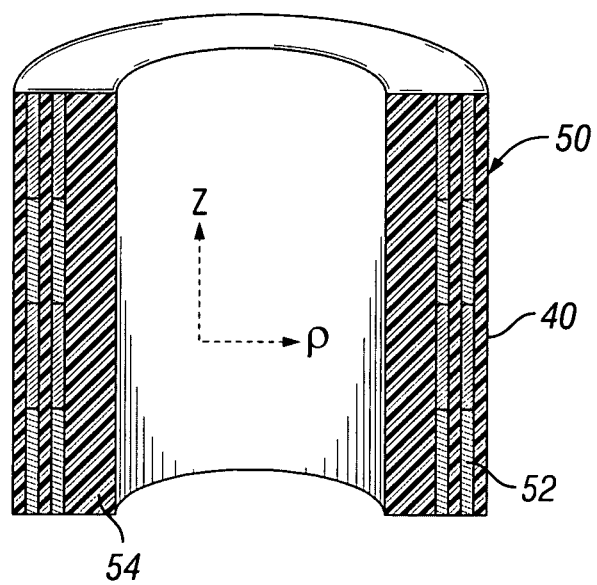
FIG. 2 shows an example composite tube usable as an instrument housing.

FIG. 2 shows a composite tube 40 including an inner conduit 54 that may be made from electrically non-conductive material such as plastic or ceramic such as materials sold under the trademarks DURA Z and ZIRCONIA, which are trademarks of CoorsTek Corporation, North Table Mountain, 16000 Table Mountain Pkwy Golden, Colo. 80403. Such tube 40 may be used for an instrument housing as explained above. Examples of plastic for the inner conduit 54 may include polyamide or polyimide, for example, a plastic sold under the trademark TORLON, which is a registered trademark of Solvay Advanced Polymers LLC, 4500 McGinnis Ferry Road, Alpharetta, Ga. 30005. Another example material that may be used for the inner conduit 54 is a plastic sold under the trademark RADEL, which is also a registered trademark of Solvay Advanced Polymers LLC.

The inner conduit 54 may be surrounded on its exterior by one or more layers, shown in FIG. 2 at 50 and 52, of fiber, for example, glass fiber, carbon fiber and/or other composition fiber disposed in a resin matrix. One example of a resin for embedding the fiber is one sold under the trademark KEMLOX, which is a registered trademark of Kemlon Products & Development Co., 6315 England St., Houston, Tex. 77021. Other examples of embedding matrix material include polybenzamidazole, for example, a composition sold under the trademark CELAZOLE, which is a registered trademark of PBI Performance Products, Inc., 9800-D Southern Pine Boulevard Charlotte, N.C. 28273. Other examples include a product sold under the trademark RANDOLITE, which is a trademark of Randolph Products Company, 33 Haynes Circle, Chicopee, Mass. 01020. The fibers may also be embedded in a matrix made with a resin from a group of thermoplastic resins known by the acronym PEEK (polyetheretherketone).

In various examples of a fiber reinforced plastic tube, a layer of fiber disposed generally on the exterior of the composite tube 40, e.g., layer 52 in FIG. 2, may include at least one, and preferably a substantial amount of carbon fiber. Such fiber composition may provide the exterior surface of the composite tube with enhanced abrasion resistance and chemical/water resistance. One or more layers of fiber disposed below the outermost layer, e.g., 50 in FIG. 2, may be substantially all glass fiber to provide structural strength to the composite tube 40, while being substantially transparent to electromagnetic radiation.

In some examples, the fiber layer(s) in which carbon fiber is used may be arranged to minimize electrical conductivity with respect to electromagnetic energy generated by certain devices disposed inside the respective instrument housing (inside the tube 40) and detected by associated sensors disposed inside the tube 40. For example, an outer fiber layer, shown at 50 in FIG. 2 may be made from carbon fiber. The layer 50 may be made by extending a plurality of fibers alongside each other and extended along their length into a substantially flat ribbon having a selected width. The ribbon may be immersed into the embedding matrix material during manufacture thereof. In the example shown in FIG. 2, electrical conductivity of the outer fiber layer 50 with respect to electromagnetic energy from devices (not shown in FIG. 2) may be decreased by arranging the ribbon so that it extends along direction of the longitudinal axis (indicated by Z in FIG. 2) of the composite tube 40. The outer fiber layer 50 may surround an inner fiber layer 52 which may be made from glass fiber embedded in matrix as explained above. The inner fiber layer 52 may also be arranged as ribbon like structure as explained above, and disposed around the conduit 54 so that the fibers extend around the circumference of the conduit 54 (referred to in FIG. 2 as the direction). Arranging the inner fiber layer 52 as explained will provide the tube 40 with substantial hoop strength. Various examples may include a plurality of fiber reinforced layers disposed outside the conduit 54 of alternating composition of glass fiber and other composition fiber.

The foregoing examples of glass and carbon fiber layers may be preformed by embedding a selected number of longitudinally extending fibers in a matrix as explained above, and causing the matrix to harden or set. The preformed layer may be made to any selected width, subject to certain limitations set forth below. Preforming the fiber layers may provide advantages in manufacturing the composite structure tube. It is to be understood that preforming the fiber layers is only an example of how to make a composite tube according to the invention. In other examples, individual fibers may be embedded in a matrix, and wound around the exterior of the tube. In still other examples, a matrix may be pre-applied to the exterior of the tube, and one or more fibers wound about the exterior of the tube. Any or all of the foregoing fiber application examples may be used individually or in any combination in making a composite tube.

Figure 3:
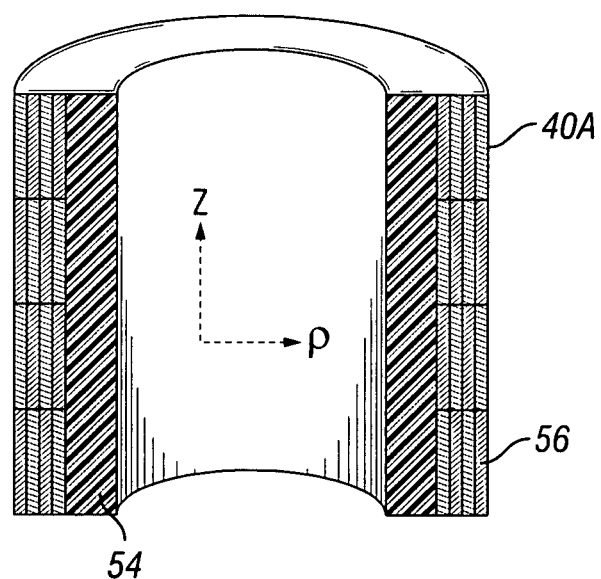
FIG. 3 shows another example of a composite tube.

Another example of a composite structure tube is shown in FIG. 3. The composite structure tube 40A may include an inner conduit 54 substantially as explained above with reference to FIG. 2, and one or more composite layers 56 including glass fiber bonded to carbon fiber. The composite layer(s) may be arranged from ribbons as explained above, and may be wound so that the glass fibers traverse the circumference of the conduit 54 (in the direction), while the carbon fibers are orthogonal to the circumference.

Figure 4:
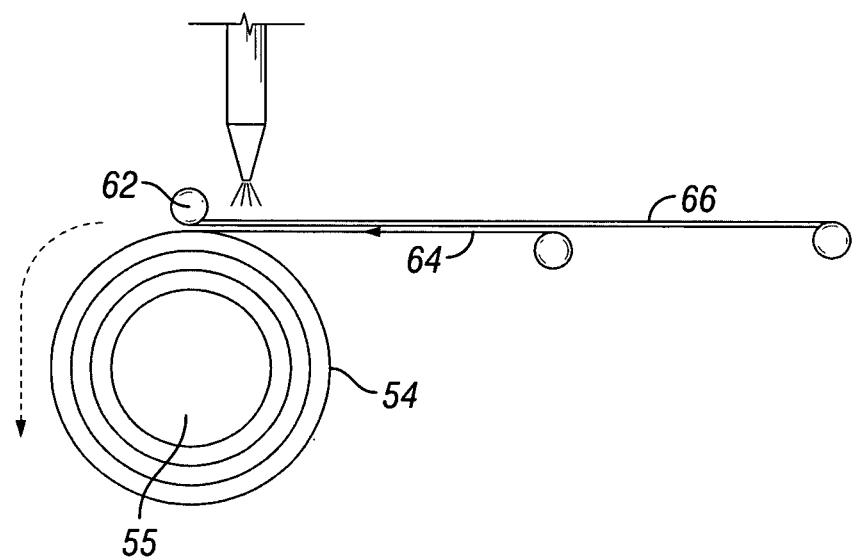
FIG. 4 shows an example process for making composite tube.

A process for making pre-embedded fiber reinforced resin layers as may be used in composite tube structures is shown schematically in FIG. 4. Glass fiber 66 and carbon fiber 64 layers each embedded in plastic such as PEEK may be drawn around the conduit 54 as the conduit is rotated by a mandrel 55. The fiber layers 64, 66 may be caused to bond to each other by application of heat, such as by a jet 60 of heated, inert gas. Other heating techniques will occur to those skilled in the art. The heated layers 64, 66 may be applied to the exterior of the conduit 54 such as by a pinch roller 62. To make a plurality of fiber reinforcing layers, the process need only be continued until a selected number of layers is applied to the exterior of the conduit 54. As explained above, the layers containing carbon fiber may be arranged to minimize closed loops of such fiber to maximize transparency of the tube to electromagnetic radiation. The process shown in FIG. 4 is available commercially from a number of sources, including, without limitation, Automated Dynamics, 407 Front Street, Schenectady, N.Y. 12305 and Hexcel Corporation, Two Stamford Plaza, 281 Tresser Blvd., Stamford, Conn. 06901.

Figure 5:
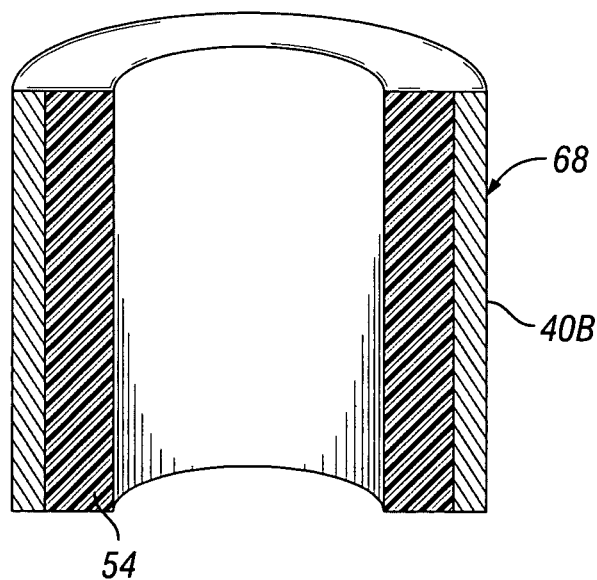
FIG. 5 shows another example of a composite tube structure.

Another example of a composite tube structure is shown in FIG. 5. The tube structure 40B in FIG. 5 includes a plastic or ceramic inner conduit 54 as in the previous examples. The conduit 54 may be surrounded on its exterior by one or more layers 68 of woven glass cloth or composite woven glass/carbon (or other composition) fiber cloth. The cloth may be impregnated with, for example the previously described KEMLOX or RANDOLITE thermoset plastic or RADEL plastic. If carbon fiber is used, the cloth should be arranged such that the carbon fibers only traverse the longitudinal direction and do not traverse the circumference (direction), thus avoiding closed loops of carbon fiber. Alternatively, the fibers may be arranged in longitudinal ribbon form as explained above, and the ribbon may be arranged about the exterior of the conduit 54 in a helical pattern so that the carbon fibers form substantially no closed loops. In other examples, the fiber layer(s) may include one or more carbon fibers extending longitudinally alongside glass fibers in a single ribbon. In making a composite tube according to such examples, the fiber ribbon should be applied to the exterior of the conduit (54 in FIG. 2) such that the carbon fibers form substantially no closed loops. One example of such arrangement, as explained above, is in a helical pattern. By arranging the carbon fibers to avoid closed loops, the composite tube structure will be substantially transparent to electromagnetic radiation within frequency ranges ordinarily used for electromagnetic resistivity well logging (0.01 to 1000 MHz).

Figure 6:
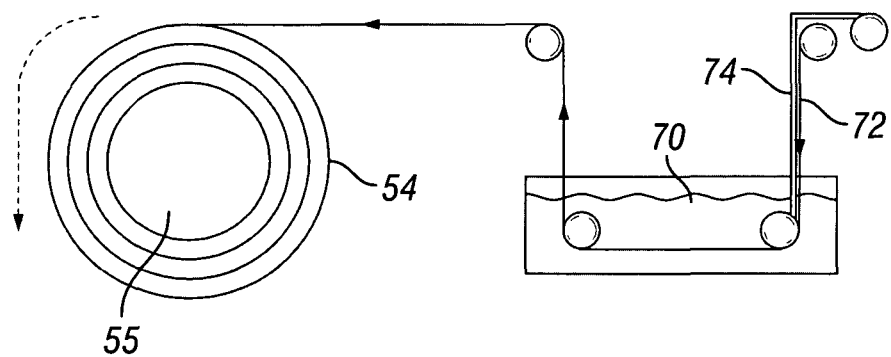
FIG. 6 shows another example of a process for making a composite tube.

An example process for making the composite fiber layers of FIG. 5 is shown in FIG. 6. A layer of carbon fiber cloth 74 may be unwound from a reel alongside a reel of carbon fiber cloth or composite glass/carbon fiber cloth 72. The fiber cloth layers 74, 72 may be immersed in embedding material 70, such as the ones described above. The combined embedded cloth layers 72, 74 may be wound onto the exterior of the conduit 54 as shown in FIG. 6 by affixing the conduit 54 to a mandrel 55 or similar device. As in other examples, the orientation of the carbon fibers should be such that closed loops of fiber are avoided. Furthermore the width of the carbon fiber layer preferably does not to exceed one skin depth of electromagnetic energy emitted and/or detected by various instrument devices. Skin depth may be computed by the expression $$\delta = \sqrt{\frac{2}{\omega\mu\sigma}}$$

where μ is the permeability ω is the angular frequency and σ is the transverse conductivity of the embedded fiber strip, which is typically about 100 S/m. Such orientation may be arranged, for example, by helically winding the carbon fiber cloth around the exterior of the composite tube structure.

The fiber layer(s) should be bonded to the exterior of the conduit. Bonding of the innermost fiber layer will be directly to the exterior surface of the conduit, and each additional layer of fiber will be bonded to the exterior of the previous fiber layer. As used herein "bonded to the tube" or conduit is therefore intended to mean direct bonding for the first layer and indirect bonding for any subsequently applied layers.

Figure 7:
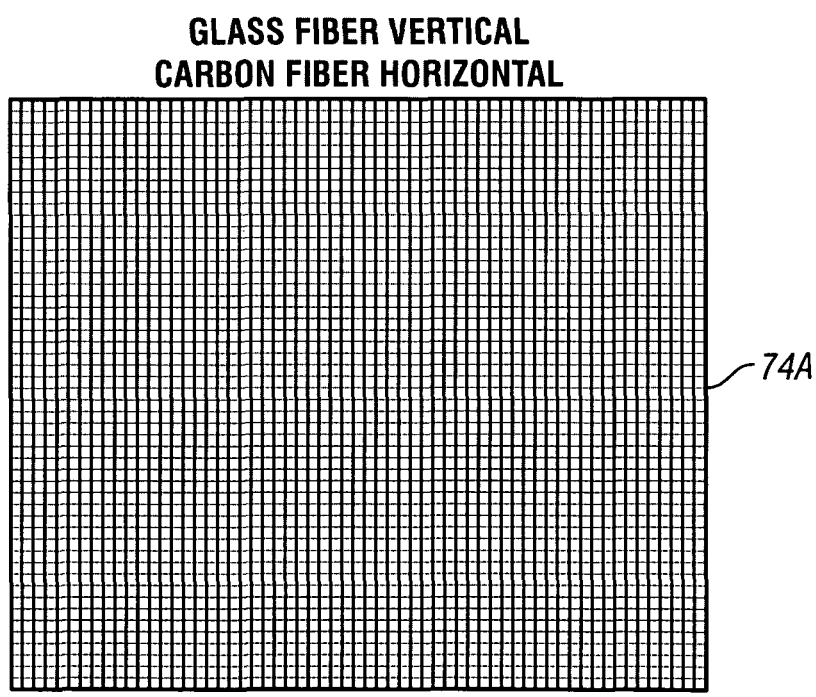
FIG. 7 shows an example composite fiber cloth.

Another example of a ribbon that may be used in one or more of the fiber layers is shown in FIG. 7. A composite fiber cloth 74A woven from glass and carbon fibers is arranged so that all or substantially all the glass fibers extend in one direction, and all or substantially all the carbon fibers extend transversely to the glass fibers. In the example shown in FIG. 7, the glass fibers extend horizontally and the carbon fibers extend vertically. Such composite cloth 74A may be formed into ribbon of selected width and having longitudinal direction parallel to the direction of the glass fibers. Such cloth 74A may be wound about the exterior of the conduit (54 in FIG. 2) substantially in a circumferential direction (direction as explained with reference to FIG. 2). Because the carbon fibers extend transversely to the glass fibers, and thus transversely to the longitudinal direction of the cloth 74A, the carbon fibers will form substantially no closed loops when applied to the exterior of the conduit (54 in FIG. 2).

Figure 8:
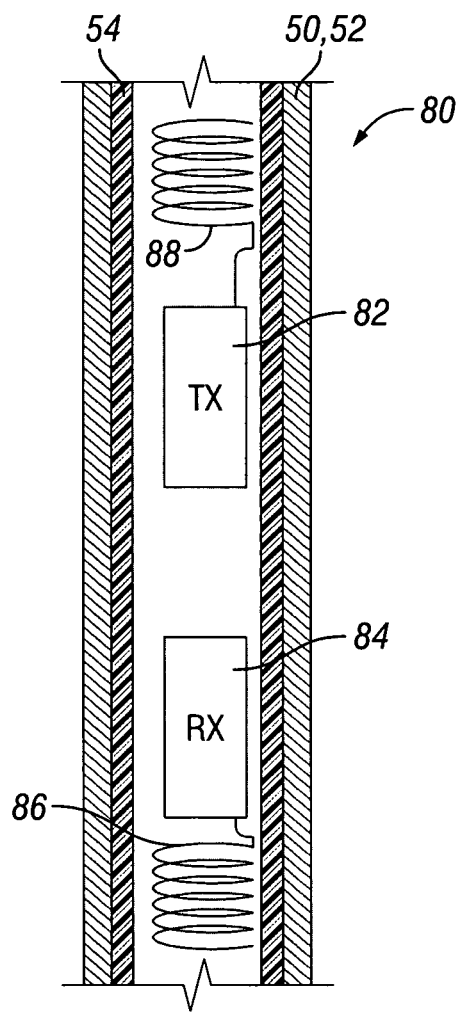
FIG. 8 shows an example electromagnetic well logging instrument.

An example of a wellbore instrument made using a composite tube is shown in FIG. 8. The instrument 80 may use a composite tube structure as in any of the previous examples. The composite tube structure may include a conduit 54 made as explained above, surrounded by one or more fiber layers 50, 52. An electromagnetic transmitter 88 coupled to suitable transmitter driver circuitry 82 may be disposed within the interior of the conduit 54. An electromagnetic receiver 86 may be disposed inside the conduit 54 and coupled to suitable receiver circuitry 84. The transmitter 88 may be a solenoid coil or any other structure used to emit electromagnetic radiation. The receiver 84 may be the same or different structure for detecting electromagnetic radiation. In other examples, the transmitter and receiver may be the same structure, coupled through a suitable switch (not shown) to the respective transmitter and receiver circuits. The transmitter and receiver, whether they are included as discrete elements or are the same element, may perform any electromagnetic formation measurements known in the art, including, without limitation, dielectric measurement, electromagnetic wave propagation measurement, electromagnetic induction measurement, and nuclear magnetic resonance measurement. A well logging instrument made as shown in FIG. 8 may provide sufficient strength to be coupled within a "string" of wellbore instrumentation including further instruments longitudinally below the instrument shown in FIG. 8 without the need to have an interior metal mandrel, or with a mandrel of substantially smaller size than is typically necessary to make an instrument configurable to be such part of a string of instruments. See, for example, U.S. Pat. No. 4,651,101 issued to Chandler et al. and assigned to the assignee of the present invention for explanation of such mandrel as used in electromagnetic well logging instruments. See also, for example, U.S. Pat. No. 7,0918,877 issued to Barber et al. and assigned to the assignee of the present invention for explanation of such tool as used in electromagnetic well logging instruments.

A composite structure tube and wellbore instrument made according to the various aspects of the invention may provide reduced manufacturing costs and improved signal to noise ratio of electromagnetic sensing as contrasted with devices known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A well logging instrument housing, comprising:
    an electrically non-conductive tube, wherein the electrically non-conductive tube comprises ceramic; and
    at least one layer of fiber embedded in a matrix surrounding an exterior of the tube, the at least one fiber layer including at least one carbon fiber, the at least one carbon fiber arranged to have substantially no closed loops therein.

2. The housing of claim 1 wherein the tube comprises polyamide.

3. The housing of claim 1 wherein the tube comprises polyimide.

4. The housing of claim 1 wherein the at least one fiber layer comprises a plurality of glass fibers, the glass fibers and the least one carbon fiber arranged in a substantially flat ribbon.

5. The housing of claim 4 wherein the glass fibers and the at least one carbon fiber are disposed in a matrix.

6. The housing of claim 5 wherein the matrix comprises polyetheretherketone.

7. The housing of claim 1 wherein the at least one fiber layer comprises polyetheretherketone matrix.

8. The housing of claim 1 further comprising at least a second fiber layer having glass fiber disposed in a ribbon.

9. The housing of claim 1 wherein the at least one fiber layer comprises woven cloth including glass fiber and carbon fiber, the glass fiber arranged along a longitudinal dimension of the cloth, the carbon fiber arranged transversely to the glass fiber.

10. An electromagnetic well logging instrument, comprising:
    an electrically non-conductive tube;
    at least one layer of fiber embedded in a matrix surrounding an exterior of the tube, the at least one fiber layer including at least one carbon fiber, the at least one carbon fiber arranged to have substantially no closed loops therein; and
    at least one of an electromagnetic receiver and an electromagnetic transmitter disposed inside the tube.

11. The instrument of claim 10 wherein the tube comprises polyamide.

12. The instrument of claim 10 wherein the tube comprises polyimide.

13. The instrument of claim 10 wherein the tube comprises ceramic.

14. The instrument of claim 10 wherein the at least one fiber layer comprises a plurality of glass fibers, the glass fibers and the least one carbon fiber being arranged in a substantially flat ribbon.

15. The instrument of claim 14 wherein the glass fibers and the at least one carbon fiber are disposed in a matrix.

16. The instrument of claim 15 wherein the matrix comprises polyetheretherketone.

17. The instrument of claim 10 wherein the at least one fiber layer comprises a polyetheretherketone matrix.

18. The instrument of claim 10 further comprising at least a second fiber layer having glass fiber disposed in a ribbon.

19. The instrument of claim 10 wherein the at least one fiber layer comprises woven cloth including glass fiber and carbon fiber, the glass fiber arranged along a longitudinal dimension of the cloth, the carbon fiber arranged transversely to the glass fiber.

20. A method for making a well logging instrument housing, comprising:
    applying at least one layer of fiber over an electrically non-conductive tube, wherein the electrically non-conductive tube comprises ceramic, the layer of fiber including at least one carbon fiber arranged to have substantially no closed loops, the fiber layer including a resin matrix; and
    bonding the at least one layer of fiber to an exterior of the tube.

* * * * *